(12) United States Patent
Dickinson et al.

(10) Patent No.: US 7,481,522 B2
(45) Date of Patent: Jan. 27, 2009

(54) COMPOSITIONS AND INKS CONTAINING DISAZO DYES

(75) Inventors: Alan Dickinson, Grangemouth (GB); Neil James Thompson, Manchester (GB); Paul Wight, Manchester (GB); Peter Gregory, Bolton (GB); Philip John Double, Manchester (GB); Roy Bradbury, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 423 days.

(21) Appl. No.: 10/516,496

(22) PCT Filed: Jun. 5, 2003

(86) PCT No.: PCT/GB03/02438

§ 371 (c)(1),
(2), (4) Date: Dec. 1, 2004

(87) PCT Pub. No.: WO03/104332

PCT Pub. Date: Dec. 18, 2003

(65) Prior Publication Data

US 2006/0017791 A1    Jan. 26, 2006

(30) Foreign Application Priority Data

Jun. 7, 2002    (GB) .................................. 0213011.0

(51) Int. Cl.
*G01D 11/00*    (2006.01)
(52) U.S. Cl. .......................... 347/100; 347/95; 523/160
(58) Field of Classification Search ................. 347/100, 347/95, 96, 101; 106/31.27, 31.6, 31.13; 523/160
See application file for complete search history.

(56) References Cited

U.S. PATENT DOCUMENTS

| | | | |
|---|---|---|---|
| 3,445,450 A | 5/1969 | Signon et al. | |
| 3,527,749 A | 9/1970 | Vrzalova et al. | |
| 3,546,202 A | 12/1970 | Buděšinsky et al. | |
| 4,361,842 A | 11/1982 | Haruta et al. | |
| 4,626,284 A | 12/1986 | Ohta et al. | ............... 106/31.52 |
| 4,703,113 A | 10/1987 | Baxter et al. | ............... 534/796 |
| 4,963,189 A | 10/1990 | Hindagolla | ............... 106/31.52 |
| 7,056,376 B2 * | 6/2006 | Popat et al. | ............... 106/31.52 |

FOREIGN PATENT DOCUMENTS

| | | |
|---|---|---|
| EP | 0 347 803 A2 | 12/1989 |
| EP | 0 425 150 A2 | 5/1991 |
| EP | 508 443 | 10/1992 |
| EP | 0 539 178 A2 | 4/1993 |
| EP | 1 229 083 A2 | 8/2002 |
| FR | 1 486 243 | 6/1967 |
| GB | 1 123 094 | 8/1968 |
| GB | 1130348 | 10/1968 |
| JP | 59-75965 | 4/1984 |
| JP | 2002-020659 | * 1/2002 |
| JP | 2002 020659 | 1/2002 |

OTHER PUBLICATIONS

Savvin et al., "New organic reagent for determining zinc", Zhurnal Analiticheskoi Khimii, 27(12):2354-7 (1972).
Budesinsky, "Monoarylazo and Bis(arylazo) Derivatives of Chromotropic Acid as Photometric Reagents", Review, pp. 1-91 (1967).

* cited by examiner

*Primary Examiner*—Manish S Shah
(74) *Attorney, Agent, or Firm*—Morgan Lewis Bockius LLP

(57) ABSTRACT

A process for printing an image on a substrate including applying thereto a composition including a liquid medium and a compound of Formula (1) A-N=N-L-N=N-A wherein: each A independently is optionally substituted aryl or heteroaryl; and L is an optionally substituted, optionally metallised 1,8-dihydroxynaphthylene group; provided that: (i) at most one of the groups represented by A has a hydroxy substituent ortho to the —N=N— groups shown in Formula (1); and (ii) Formula (1) is not: Also claimed are compositions for printing, compounds and processes for making the compounds.

18 Claims, No Drawings

COMPOSITIONS AND INKS CONTAINING DISAZO DYES

This invention relates to compounds suitable for use as dyes and processes for their manufacture, to compositions derived therefrom and to their use in printing, especially ink jet printing ("IJP"). IJP is a non-impact printing technique in which droplets of a composition are ejected through a fine nozzle onto a substrate without bringing the nozzle into contact with the substrate.

There are many demanding performance requirements for dyes and compositions used in IJP. For example they desirably provide sharp, non-feathered images having good water-fastness, light-fastness and optical density. The compositions are often required to dry quickly when applied to a substrate to prevent smudging, but they should not form a crust over the tip of an ink jet nozzle because this will stop the printer from working. The compositions should also be stable to storage over time without decomposing or forming a precipitate which could block the fine nozzle.

GB 1,130,348 discloses the preparation of metallised disazo reactive dyes derived from chromotropic acid for the conventional dyeing of textiles.

U.S. Pat. No. 4,361,842 discloses the use of metallised compounds derived from chromotropic acid to prolong the service life of recording heads in thermal ink jet printers.

Japanese application JP 2002-20659 discloses recording liquids for ink-jet printing comprising metallised dyes containing a group of the following formula:

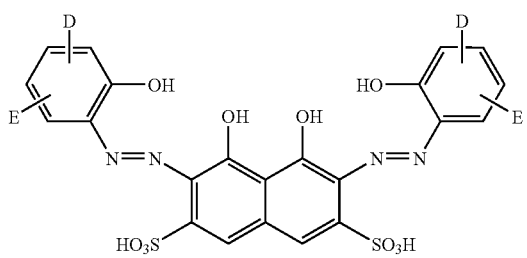

wherein D and E are as defined in JP 2002-20659, wherein both of the phenylazo groups attached to the central chromotropic acid group have a hydroxy substituent ortho to the —N═N— groups as shown above.

Surprisingly it has been found that dyes of the present invention have outstanding properties when used in ink jet inks.

According to the present invention there is provided a process for printing an image on a substrate comprising applying thereto a composition comprising a liquid medium and a compound of Formula (1):

 A-N═N-L-N═N-A      Formula (1)

wherein:
each A independently is optionally substituted aryl or heteroaryl; and
L is an optionally substituted, optionally metallised 1,8-dihydroxynaphthylene group;

provided that at most one of the groups represented by A has a hydroxy substituent ortho to the —N═N— groups shown in Formula (1) and further provided that the compound of Formula (1) is not:

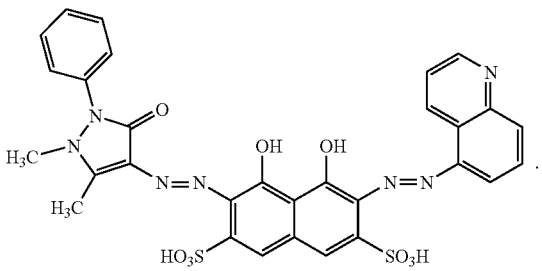

Preferably the composition is applied to the substrate by means of an ink jet printer. The ink jet printer preferably applies the composition to the substrate in the form of droplets which are ejected through a small orifice onto the substrate. Preferred ink jet printers are piezoelectric ink jet printers and thermal ink jet printers. In thermal ink jet printers, programmed pulses of heat are applied to the composition in a reservoir by means of a resistor adjacent to the orifice, thereby causing the composition to be ejected in the form of small droplets directed towards the substrate during relative movement between the substrate and the orifice. In piezoelectric ink jet printers the oscillation of a small crystal causes ejection of the composition from the orifice.

The substrate is preferably paper, plastic, a textile, metal or glass, more preferably a treated substrate such as a coated paper or coated plastic, especially coated paper. Preferred plain or treated papers are papers which may have an acid, alkaline or neutral character. Examples of commercially available treated papers include HP Premium™ Coated Paper, HP Photopaper™, HP Printing Paper™, HP new and improved Premium Plus Photopaper™ (available from Hewlett Packard Inc.); Stylus Pro™ 720 dpi Coated Paper, Epson Photo Quality™ Glossy Film, Epson Photo Quality™ Glossy Paper, Epson Premium PhotoPaper™ (all available from Seiko Epson Corp.); Canon HR 101™ High Resolution Paper, Canon GP 201™ Glossy Paper, Canon HG 101™ and HG 201™ High Gloss Film, Canon PR101™ (all available from Canon); Kodak Premium Photopaper™, Kodak Premium InkJetpaper™ (available from Kodak); Konica Inkjet Paper QP™ Professional Photo Glossy, Konica Inkjet Paper QP™ Professional Photo 2-sided Glossy, Konica Inkjet Paper QP™ Premium Photo Glossy, Konica Inkjet Paper QP™ Premium Photo Silky (available from Konica); Ilford Instant Dry Paper™ (available from Ilford).

Preferred optionally substituted aryl groups represented by A are optionally substituted phenyl and naphthyl. Preferred optionally substituted heteroaryl groups represented by A are any heterocycle or substituted heterocycle comprising a 5 to 7 membered ring, more preferably optionally substituted pyridyl, pyrazolyl or 1,2,4-triazole.

The groups represented by A in Formula (1) may be the same as each other or, more preferably, different from each other.

Optional substituents which may be present on A are preferably selected from OH (subject to the proviso that at most one of the groups represented by A has a hydroxy substituent ortho to the —N═N— groups shown in Formula (1)), $SO_3H$, $PO_3H_2$, $CO_2H$, $NO_2$, $NH_2$, optionally substituted alkyl (especially $C_{1-4}$-alkyl optionally carrying a sulpho, carboxy, phosphato, $C_{1-4}$-alkoxy, amino or hydroxy group), optionally substituted alkoxy (especially $C_{1-4}$-alkoxy optionally carrying a sulpho, carboxy, phosphato, $C_{1-4}$-alkoxy, $C_{1-4}$-alkyl, amino or hydroxy group), amine (especially N carrying one or two $C_{1-4}$-alkyl groups optionally carrying a sulpho, carboxy, phosphato, $C_{1-4}$-alkoxy, amino or hydroxy group), acylamine (especially $C_{1-4}$-acylamino) and ureido. Preferred substituents for A are sulpho, hydroxy, nitro, amino, acetylamino and carboxy.

Preferably each A independently carries from 0 to 3 substituents, more preferably 1 or 2 substituents.

Preferably at least one of the groups represented by A carries a group selected from sulpho and carboxy.

As examples of optionally substituted phenyl groups represented by A there may be mentioned 2-sulphophenyl, 3-sulphophenyl, 4-sulphophenyl, 2-nitrophenyl, 3-nitrophenyl, 4-nitrophenyl, 2-sulpho-4-phosphatophenyl, 2-sulpho-4-aminophenyl, 2-sulpho-4-acetylaminophenyl, 2-sulphomethoxyphenyl, 2-sulpho-5-aminophenyl, 3-sulpho-4-nitrophenyl, 3-sulpho-4-aminophenyl, 2-sulpho-4-nitrophenyl, 2,5-disulfophenyl, 2-5-disulpho-4-acetylaminophenyl, 2-hydroxy-3,5-disulphophenyl, 2-carboxy-4-acetylaminophenyl, 2-carboxy-4-aminophenyl, 3,5-dicarboxyphenyl and 2,5-dihydroxyethyloxyphenyl.

Preferably both of the groups represented by A are free from hydroxy substituents ortho to the —N=N— groups shown in Formula (1).

L is preferably optionally substituted 1,8-dihydroxynaphthylene, i.e. unmetallised.

Preferably L is of Formula (2) or a metal complex thereof:

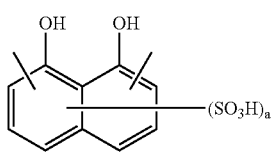

Formula (2)

wherein a is 1 or 2 and $SO_3H$ is in free acid or salt form. Preferably a is 2 and the $SO_3H$ groups shown in Formula (2) are in the 3- and 6-positions or the 3- and 5-positions.

In a preferred aspect of the invention, L is of Formula (3) or a metal complex thereof:

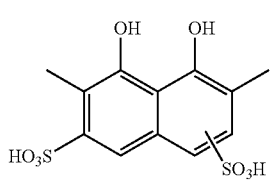

Formula (3)

More preferably L is of Formula (4) or (5) or a metal complex thereof:

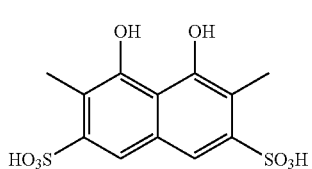

Formula (4)

-continued

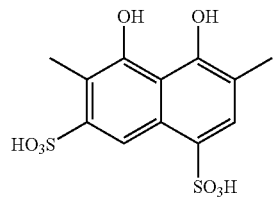

Formula (5)

In Formulae (3), (4) and (5) the $SO_3H$ groups include the free acid and salt forms.

When L is a metallised 1,8-dihydroxynaphthylene group (i.e. a metal complex) the metal is preferably B or a transition metal, more preferably Mn, Fe, Cr, Co, Ni, Cu or Zn, especially Co, Ni or Cu. The metal may be complexed with the compound of Formula (1) in a ratio of from 1:2 to 2:1, preferably in a ratio of metal to compound of Formula (1) of 1:2, 2:3, 1:1, 2:2 or 2:1, especially 2:1. However we have found that when L is not metallised the compound of Formula (1) is still a valuable colorant for ink jet printing. Such unmetallised dyes are cheaper and easier to make than the corresponding metallised dyes and they are more environmentally friendly due to the absence of transition metals. Furthermore the absence of transition metals also reduces the likelihood of nozzle blockage in thermal ink jet printers.

According to a second aspect of the present invention there is provided a composition comprising:

(a) 0.2 to 12 parts of the compound of Formula (1) as hereinbefore defined; and (b) from 88 to 99.8 parts of a liquid medium;

wherein all parts are by weight and the number of parts of (a)+(b)=100.

The composition used in the first aspect of the invention is preferably as defined in the second aspect of the present invention.

The number of parts of component (a) is preferably from 0.2 to 12, more preferably from 0.5 to 10, and especially from 1 to 8 parts. The number of parts of component (b) is preferably from 99.8 to 88, more preferably from 99.5 to 90, especially from 99 to 92 parts.

When the medium is a liquid, preferably component (a) is completely dissolved in component (b). Preferably component (a) has a solubility in component (b) at 20° C. of at least 10%. This allows the preparation of liquid dye concentrates which may be used to prepare inks and reduces the chance of the dye precipitating if evaporation of the liquid medium occurs during storage.

Preferred liquid media include water or a mixture of water and an organic solvent.

When the liquid medium comprises a mixture of water and an organic solvent, the weight ratio of water to organic solvent is preferably from 99:1 to 1:99, more preferably from 99:1 to 50:50 and especially from 95:5 to 70:30.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$alkyl and $C_{1-4}$-alkyl ethers of diols, more preferably mono-$C_{1-4}$-alkyl ethers of diols having 2 to 12 carbon atoms, especially ((2-methoxy-2)ethoxy)-2-ethoxyethanol.

Examples of further suitable ink media comprising a mixture of water and one or more organic solvents are described in U.S. Pat. Nos. 4,963,189, 4,703,113, 4,626,284 and EP 4,251,50A.

The pH of the composition is preferably from 4 to 11, more preferably from 7 to 10.

The viscosity of the composition at 25° C. is preferably less than 50 cP, more preferably less than 20 cP and especially less than 5 cP.

When the compositions according to the invention are used as ink jet printing compositions, the composition preferably has a concentration of halide ions of less than 500 parts per million, more preferably less than 100 parts per million. It is especially preferred that the composition has less than 100, more preferably less than 50 parts per million of divalent and trivalent metals, wherein parts refer to parts by weight relative to the total weight of the composition. We have found that purifying the compositions to reduce the concentration of these undesirable ions reduces nozzle blockage in ink jet printing heads, particularly in thermal ink jet printers.

The compounds of Formula (1) may be used as the sole colorant in the compositions because of their attractive black shade. However, if desired, one may combine the present compounds with one or more further colorants if a slightly different shade is required for a particular end use. The further colorants are preferably dyes. When further colorants are included in the composition these are preferably selected from but not limited to black, magenta, cyan and yellow colorants and combinations thereof.

Suitable further black colorants include C.I. Food Black 2, C.I. Direct Black 19, C.I. Reactive Black 31, PRO-JET™ Fast Black 2, C.I. Direct Black 195; C.I. Direct Black 168; and black dyes described in patents by Lexmark (e.g. EP0539178A2, Example 1, 2, 3, 4 and 5), Orient Chemicals (e.g. EP 0 347 803 A2, pages 5-6, azo dyes 3, 4, 5, 6, 7, 8, 12, 13, 14, 15 and 16) and Seiko Epson Corporation.

Suitable further magenta colorants include PRO-JET™ Fast Magenta 2.

Suitable further yellow colorants include C.I. Direct Yellow 142; C.I. Direct Yellow 132; C.I. Direct Yellow 86; C.I. Direct Yellow 85; C.I. Direct Yellow 173; and C.I. Acid Yellow 23.

Suitable further cyan colorants include phthalocyanine colorants, Direct Blue 199 and Acid Blue 99.

The composition according to the second aspect of the present invention and that used in the process according to the first aspect of the present invention may also contain additional components conventionally used in ink jet printing inks, for example viscosity and surface tension modifiers, corrosion inhibitors, biocides, kogation reducing additives and surfactants which may be ionic or non-ionic.

In a third aspect of the invention we have also devised a process for preparing a compound of Formula (1) as hereinbefore defined which comprises diazotising an amine of formula A-$NH_2$ to give a diazonium salt, and coupling the resultant diazonium salt with a compound of Formula (6):

A-N=N-LH                                                      Formula (6)

wherein L and each A independently is as hereinbefore defined.

Preferably the diazotsation is performed using a diazotising agent, especially sodium nitrite. Further preferably the diazotisation is performed at a temperature of 0 to 5° C. Surprisingly we have found that the coupling can be performed under conditions of moderate, i.e relatively neutral, pH facilitated by the use of substantial amounts of aprotic solvents. Typically the diazotisation is performed in a liquid medium. Preferred liquid media are water and compositions comprising water and an organic solvent, especially an aprotic solvent. Aprotic solvents which may be used may be chosen from, for example, dimethylformamide, dimethylsulphoxide, N-methylpyrrolidone, 2-pyrrolidone, ethers, acetone, glymes such as polyglyme (MW 300) or polyethylene glycols and/or mixtures thereof. Particularly preferred aprotic solvents are tetrahydrofuran, N-methylpyrrolidone and polyglyme. The aprotic solvent is preferably present in the range 0 to 80 wt %, preferably 20 to 60 wt %, especially 25 to 45 wt % relative to the total weight of the liquid medium. Use of substantial amounts of aprotic solvents has the advantage of permitting diazo coupling at much lower pH than customary (usually pH in the region of 14), thereby significantly improving the efficiency, from 30% to as much as 70%, of the process as a result of greatly reduced decomposition of diazonium salts.

Preferably the process of the third aspect of the present invention is performed in the presence of an acid binding agent to maintain a moderate pH. Preferably the acid binding agent used is any which maintains the pH between 5 and 9, preferably between 6 and 7.5. Further, the acid binding agent is preferably selected from but is not limited to alkali metal hydroxides, carbonates, bicarbonates or phosphates or organic bases such as triethanolamine or triethylamine. Particularly preferred alkali metal hydroxide acid-binding agents are NaOH, KOH and LiOH, especially NaOH and LiOH. Particularly preferred alkali metal carbonate acid-binding agents are $Li_2CO_3$ and $Na_2CO_3$, especially $Na_2CO_3$. This has the advantage of maintaining pH sufficiently low to reduce the decomposition of diazonium salts significantly.

A fourth feature of the present invention comprises a process for the preparation of a compound of Formula (1) which comprises the reaction of a compound of formula A-N=N-Q-N=N-A (wherein each A independently is as hereinbefore defined and Q is an optionally substituted 1-hydroxy-8-amino-naphthylene group) with a strong base thereby forming a compound for Formula (1) as hereinbefore defined, optionally followed by contacting the compound so formed with a metal salt. Preferably the strong base is a metal hydroxide, more preferably an alkali metal hydroxide, especially sodium or potassium hydroxide. The reaction with strong base preferably comprises heating in solution at an elevated temperature until reaction is complete. Preferred elevated temperatures are 60 to 90° C., more preferably 65 to 80° C., especially 65 to 75° C. The pH is preferably alkaline, more preferably 10 to 14, especially 12 to 14.

The compound of formula A-N=N-Q-N=N-A is preferably formed by diazotising an amine of formula A-NH₂, as defined above, and coupling the resultant diazonium salt with an azo compound of Formula H-Q-N=N-A wherein each A independently and Q are hereinbefore defined.

The process according to the fourth aspect of the present invention has the unexpected advantage of using common and cheaply available starting materials based on 1-amino-8-hydroxynaphthylene disulphonic acid and thereby increases the breadth of diazo components which may be used in the coupling reactions, thus significantly increasing the synthetic versatility of the standard coupling process. In a further optional step, the process comprises the complexation of a compound of Formula (1) with a metal, preferably a transition metal.

A fifth aspect of the invention provides a compound of Formula (1) and salts thereof, as hereinbefore defined, with the proviso that at least one of the groups represented by A carries a group selected from sulpho and carboxy groups (sulpho do not include sulphato). Preferably both groups represented by A carry a group selected from sulpho and carboxy groups, more preferably both groups represented by A carry a sulpho group. Preferences for A and L in the compounds of the fifth aspect of the invention are as hereinbefore defined in relation to the first aspect of the invention.

A further aspect of the present invention provides a paper, an overhead projector slide or a textile material printed with a composition, a compound or by means of a process according to the present invention.

A still further as aspect of the present invention provides an ink jet printer cartridge, optionally refillable, comprising one or more chambers and a composition, wherein the composition is present in at least one of the chambers, and the composition is as defined in the second aspect of the present invention.

The present compounds and compositions provide prints of attractive, neutral black shades which are particularly well suited for the ink jet printing of text and images. The compositions have good storage stability and low tendency to block the very fine nozzles used in ink jet printers. Furthermore, the resultant images have good optical density, light-fastness, wet-fastness and resistance to fading in the presence of oxidising air pollutants (e.g. ozone).

The invention is illustrated by the following Examples in which all parts and percentages are by weight unless specified otherwise.

EXAMPLE 1

Preparation of:

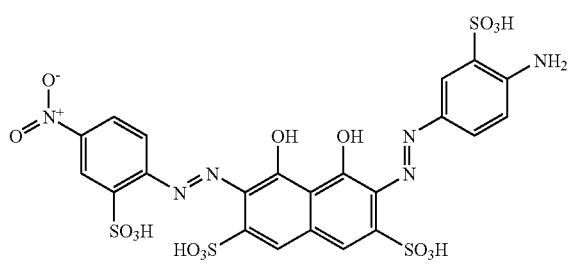

Stage (A)—Diazotisation and Coupling

5-Nitro-2-aminobenzene sulphonic acid (21.8 g, 0.10 moles) was added to water (300 ml), containing concentrated hydrochloric acid (30 g). Sodium nitrite (6.9 g, 0.10 moles) was added over 15 minutes at 0 to 5° C. After 60 minutes the excess nitrous acid was destroyed and to the resultant solution of diazonium salt was added slowly at 5 to 10° C. and pH 1 to 2, a solution of 1-hydroxy-8-aminonaphthalene-3,6-disulphonic acid (31.9 g, 0.10 moles), which had been re-precipitated in water (500 ml).

2-Acetylamino-5-aminobenzene sulphonic acid (23.0 g, 0.11 moles) was added to water (300 ml), containing concentrated hydrochloric acid (32.6 g). Sodium nitrite (7.6 g) was added over 10 minutes at 0 to 5° C. After 60 minutes the resultant solution of diazonium salt was added over 120 minutes at 5 to 10° C. and pH 8 to 9, to the above dye solution. After 10 hours the resultant product was precipitated by the addition of sodium chloride (100 g) and collected. The paste was then oven dried to give a dark blue solid (71 g).

Stage (B)—Conversion of Amino to Hydroxy Group

The dark blue solid from Stage (A) above was dissolved in water (1000 ml) and heated to 80° C. Sodium hydroxide (40 g) was added and the temperature maintained at 70° C. for 10 hours. After this time the pH was adjusted to pH 1 with concentrated hydrochloric acid and the solution allowed to cool to ambient temperature. The precipitate was then collected. The paste was then oven-dried to give 7.5 g of a black solid.

The black solid was dissolved in water (50 g) at pH 7 to 8 by the addition of sodium hydroxide (pearl). The solution was then dialysed using Visking™ tubing (<50 μScm⁻¹) and then screened through a cascade of filters (GF/A, GF/D, 0.45 μm) and dried in the oven to give the title product (7 g) as a black solid.

EXAMPLE 2

Preparation of:

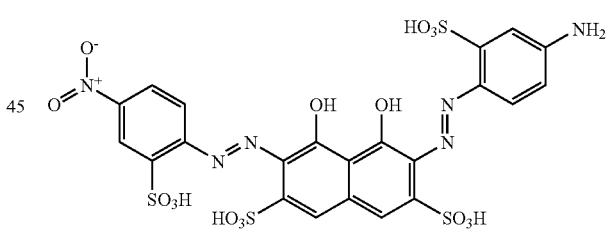

5-Acetylamino-2-aminobenzene sulphonic acid (23.0 g, 0.10 moles) was added to water (300 ml), containing concentrated hydrochloric acid (30 g). Sodium nitrite (6.9 g) was added over 10 minutes at 0 to 5° C. After 60 minutes the excess nitrous acid was destroyed and the resultant solution of diazonium salt was added slowly at 5 to 10° C. and pH 8 to 9, to a solution of 1,8-dihydroxynaphthalene-3,6-disulphonic acid (32.0 g, 0.10 moles), which had been dissolved in water (500 g). The reaction was shown to have reacted quantitatively by HPLC.

5-Nitro-2-aminobenzene sulphonic acid (43.6 g, 0.20 moles) was added to water (500 g), containing concentrated hydrochloric acid (60 g). Sodium nitrite (13.8 g) was added over 15 minutes at 0 to 5° C. After 60 minutes the resultant solution of diazonium salt was added over 120 minutes at 5 to 10° C. to the above dye solution to which previously had been added tetrahydrofuran (1000 g), whilst maintaining the pH at 7 by addition of solid Na$_2$CO$_3$. After 5 hours the resultant precipitate was then collected and after oven drying gave a dark red solid (55.3 g).

The above dark red solid was dissolved in water (1000 ml) and heated to 80° C. Sodium hydroxide (10 g) was added and the temperature maintained at 80° C. for 8 hours. After this time the pH was adjusted to 7 to 8 with concentrated hydrochloric acid and the solution allowed to cool to ambient temperature. The solution was then dialysed using Visking™ tubing (<50 μScm$^{-1}$) and then screened through a cascade of filters (GF/A, GF/D, 0.45 μm) and dried in the oven to give the title product as a black solid (47.2 g) ($\lambda_{max}$=568 nm).

EXAMPLE 3

Preparation of:

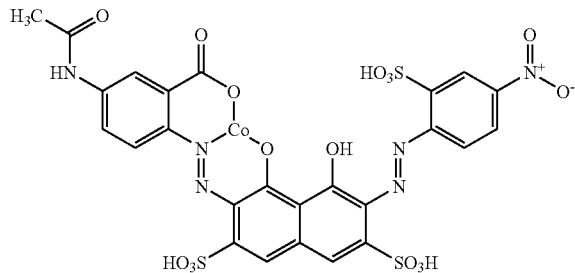

A slurry of 5-acetylamino-2-aminobenzene carboxylic acid (64 g) and sodium nitrite (24 g) in water (500 ml) was added over 40 minutes to a mixture of hydrochloric acid (120 ml, 36° Tw) and ice (120 g). The resultant mixture was stirred at <5° C. for 30 minutes and then excess nitrous acid was destroyed with sulfamic acid solution (10% w/v). The resulting solution was added over 1 hour to a solution of chromotropic acid (100 g) in water (800 ml) and ice (200 g) at pH 8 (sodium hydroxide, 48% w/v) at <5° C. During the addition the solution was maintained at pH 8-9.5. After a further hour the solution was allowed to warm to room temperature and stirred overnight.

The solution was adjusted to pH 1, filtered and the paste was washed with sodium chloride solution (500 ml, 17% w/v). The paste was then slurried in acetone (1000 ml) and dried in an oven to give a purple solid (152 g).

Cobalt acetate (11 g) was added in one portion to a solution of the purple solid (35 g) in water (350 ml) at 80° C. and pH 8.5 (concentrated ammonia solution) which was stirred for 2 hours. The solution was adjusted to pH 8.5 (concentrated ammonia solution) and allowed to cool to room temperature and stirred overnight.

Sodium chloride (35 g) was added to the solution which was stirred for one hour. A further portion of sodium chloride (35 g) was added and after one hour the mixture was filtered, washed with sodium chloride solution (300 ml, 20% w/v) and the resultant paste was slurried in acetone (500 ml) and collected by filtration. The paste was dried in an oven to give a dark blue solid (20 g).

A solution of 5-nitro-2-aminobenzene sulphonic acid (7 g) and sodium nitrite (2.5 g) in water (100 ml) at pH 8. (sodium hydroxide, 48% w/v) was added to a mixture of hydrochloric acid (20 ml, 36° Tw) and ice (20 g) over 20 minutes at <5° C. The mixture was stirred for 30 minutes and the excess nitrous acid was destroyed with sulfamic acid solution (10% w/v). This mixture was added dropwise over 35 minutes to a solution of the dark blue solid obtained above (18 g) in water (180 ml) and ice (20 g) at pH 8 (sodium hydroxide solution, 48% w/v) at <5° C. During the addition the solution was maintained at pH 8-9.5. The solution was stirred for a further hour at <5° C. and then allowed to warm to room temperature overnight at pH 8.5.

Sodium chloride (45 g) was added and the solution was stirred for 2 hours. The resulting mixture was filtered and the collected paste was washed with sodium chloride solution (200 ml, 15% w/v). The paste was then slurried in acetone (500 ml), collected by filtration and slurried in acetone (300 ml) and collected. The resulting solid was dissolved in water (150 ml), dialysed using Visking™ tubing (<50 μScm$^{-1}$) and the resulting solution was screened through a cascade of filters (GF/A, GF/D, 0.45 μm) and dried in the oven to give the title product as a black solid (9 g).

EXAMPLES 4 TO 8

The method of Example 1 was repeated except that in place of 5-nitro-2-aminobenzene sulphonic acid there was used the amine listed in Table 1, column A and in place of 2-acetylamino-5-aminobenzene sulphonic acid there was used the amine indicated in column B. For examples 4, 5 and 7, 1-hydroxy-8-aminonaphthalene-3,5-disulphonic acid was used in place of 1-hydroxy-8-aminonaphthalene-3,6-disulphonic acid. The resultant dyes had the formula shown in column C.

TABLE 1

| Ex. | A | B | C | $\lambda_{max}$ (nm) |
|---|---|---|---|---|
| 4 | 4-nitro-2-sulfoaniline | 4-acetamido-2-sulfoaniline | bis-azo chromogen structure | 545 |
| 5* | 4-nitro-2-sulfoaniline | 4-acetamido-2-sulfoaniline | bis-azo chromogen structure | 648 |
| 6 | 4-nitro-2-sulfoaniline | 4-ureido-2-sulfoaniline | bis-azo chromogen structure | — |

TABLE 1-continued

| Ex. | A | B | C | $\lambda_{max}$ (nm) |
|---|---|---|---|---|
| 7* | (2-amino-5-nitrobenzenesulfonic acid structure) | (N-acetyl-3-amino-4-sulfoaniline structure) | (bis-azo naphthalene dye structure with nitro and amino substituents) | — |
| 8*# | (2-amino-5-nitrobenzenesulfonic acid structure) | (N-acetyl-3-amino-4-sulfoaniline structure) | (bis-azo naphthalene dye structure with amino substituents) | 580 |

*synthesis included an additional hydrolysis step in aqueous sodium hydroxide to remove the acetyl group.
synthesis included an additional reduction step using sodium sulphite to convert the nitro group into an amino group.

EXAMPLES 9 TO 65

The method of Example 2 was repeated except that in place of 5-acetylamino-2-aminobenzene there was used the amine listed in Table 2, column A and in place of 5-nitro-2-aminobenzene sulphonic acid there was used the amine indicated in column B. The resultant dye had the formula shown in column C. In examples 36, 37, 38, 45 and 46 the resultant dye is a metal complex, complexation was carried out, here as a final step, in an analogous manner to Example 3 above using copper(II) acetate, cobalt(II) acetate or nickel(II) acetate as appropriate.

TABLE 2

| Ex. | A | B | C | $\lambda_{max}$ (nm) |
|---|---|---|---|---|
| 9 | (4-acetamido-2-sulfoaniline) | (2-sulfo-4-nitroaniline) | (bis-azo naphthalene dye structure) | 556 |
| 10 | (4-methoxy-2-sulfoaniline) | (2-sulfo-4-nitroaniline) | (bis-azo naphthalene dye structure) | 552 |
| 11 | (5-acetamido-2-aminobenzoic acid) | (2-sulfo-4-nitroaniline) | (bis-azo naphthalene dye structure) | 572 |

TABLE 2-continued

| Ex. | A | B | C | $\lambda_{max}$ (nm) |
|---|---|---|---|---|
| 12* | (structure) | (structure) | (structure) | — |
| 13 | (structure) | (structure) | (structure) | 574 |
| 14 | (structure) | (structure) | (structure) | 570 |

TABLE 2-continued

| Ex. | A | B | C | $\lambda_{max}$ (nm) |
|---|---|---|---|---|
| 15 | | | | — |
| 16* | | | | 580 |
| 17# | | | | 580 |

TABLE 2-continued

| Ex. | A | B | C | $\lambda_{max}$ (nm) |
|---|---|---|---|---|
| 18* | 4-acetamido-2-aminobenzenesulfonic acid | 2-amino-5-sulfobenzenesulfonic acid | bis-azo dye structure | 574 |
| 19 | 4-acetamido-2-aminobenzenesulfonic acid | 4-aminobenzenesulfonic acid | bis-azo dye structure | — |
| 20* | 4-acetamido-2-aminobenzenesulfonic acid | 4-aminobenzenesulfonic acid | bis-azo dye structure | 576 |
| 21 | 4-acetamido-2-aminobenzenesulfonic acid | 2-amino-5-sulfobenzenesulfonic acid | bis-azo dye structure | 562 |

TABLE 2-continued

| Ex. | A | B | C | $\lambda_{max}$ (nm) |
|---|---|---|---|---|
| 22* | (structure) | (structure) | (structure) | 572 |
| 23 | (structure) | (structure) | (structure) | 570 |
| 24 | (structure) | (structure) | (structure) | 543 |

TABLE 2-continued

| Ex. | A | B | C | $\lambda_{max}$ (nm) |
|---|---|---|---|---|
| 25 | 3-amino-4-sulfo-acetanilide | 2-nitroaniline | (structure) | 574 |
| 26* | 3-amino-4-sulfo-acetanilide | 4-nitroaniline | (structure) | 568 |
| 27* | 3-amino-4-sulfo-acetanilide | 3-nitroaniline | (structure) | 553 |

TABLE 2-continued

| Ex. | A | B | C | $\lambda_{max}$ (nm) |
|---|---|---|---|---|
| 28* | (structure) | (structure) | (structure) | 572 |
| 29 | (structure) | (structure) | (structure) | 552 |
| 30* | (structure) | (structure) | (structure) | 573 |

TABLE 2-continued

| Ex. | A | B | C | $\lambda_{max}$ (nm) |
|---|---|---|---|---|
| 31 | | | | 570 |
| 32 | | | | 591 |
| 33 | | | | 562 |
| 34 | | | | 528 |

TABLE 2-continued

| Ex. | A | B | C | $\lambda_{max}$ (nm) |
|---|---|---|---|---|
| 35* | | | | 558 |
| 36 | | | | 658 |
| 37 | | | | — |
| 38 | | | | — |

TABLE 2-continued

| Ex. | A | B | C | $\lambda_{max}$ (nm) |
|---|---|---|---|---|
| 39 | | | | 552 |
| 40* | | | | — |
| 41 | | | | 547 |

TABLE 2-continued

| Ex. | A | B | C | $\lambda_{max}$ (nm) |
|---|---|---|---|---|
| 42* | 4-acetamidoaniline | 2-amino-5-nitrobenzenesulfonic acid | (structure) | 555 |
| 43 | 4-amino-2-acetamido-5-sulfobenzenesulfonic acid | 4-nitroaniline | (structure) | 574 |
| 44* | 4-amino-2-acetamido-5-sulfobenzenesulfonic acid | 4-nitroaniline | (structure) | 573 |

TABLE 2-continued

| Ex. | A | B | C | $\lambda_{max}$ (nm) |
|---|---|---|---|---|
| 45 | (structure) | (structure) | (structure) | — |
| 46 | (structure) | (structure) | (structure) | 590 |
| 47 | (structure) | (structure) | (structure) | 594 |

TABLE 2-continued

| Ex. | A | B | C | $\lambda_{max}$ (nm) |
|---|---|---|---|---|
| 48 | (structure) | (structure) | (structure) | 550 |
| 49 | (structure) | (structure) | (structure) | 558 |
| 50 | (structure) | (structure) | (structure) | 622 |

TABLE 2-continued

| Ex. | A | B | C | $\lambda_{max}$ (nm) |
|---|---|---|---|---|
| 51 | (structure) | (structure) | (structure) | 582 |
| 52# | (structure) | (structure) | (structure) | 604 |
| 53# | (structure) | (structure) | (structure) | 602 |

TABLE 2-continued

| Ex. | A | B | C | $\lambda_{max}$ (nm) |
|---|---|---|---|---|
| 54 | (structure) | (structure) | (structure) | — |
| 55* | (structure) | (structure) | (structure) | 578 |
| 56 | (structure) | (structure) | (structure) | 594 |

TABLE 2-continued

| Ex. | A | B | C | $\lambda_{max}$ (nm) |
|---|---|---|---|---|
| 57 | | | | 560 |
| 58 | | | | 573 |
| 59* | | | | 582 |
| 60* | | | | 555 |

TABLE 2-continued

| Ex. | A | B | C | $\lambda_{max}$ (nm) |
|---|---|---|---|---|
| 61 | | | | 571 |
| 62 | | | | 565 |
| 63 | | | | 585 |

TABLE 2-continued

| Ex. | A | B | C | $\lambda_{max}$ (nm) |
|---|---|---|---|---|
| 64 | (structure: 5-amino-2-nitrobenzoic acid) | (structure: 5-amino-2-nitrobenzoic acid) | (bis-azo naphthalene structure with two 2-nitro-5-carboxyphenyl groups, two OH, two SO₃H) | 574 |
| 65 | (structure: 2-amino-3-sulfo-4,6-dimethoxybenzene) | (structure: 5-amino-2-nitrobenzoic acid) | (bis-azo naphthalene structure with 2-nitro-5-carboxyphenyl and 3,5-dimethoxy-2-sulfophenyl groups, two OH, two SO₃H) | 571 |

*synthesis included an additional hydrolysis step in aqueous sodium hydroxide to remove the acetyl group.
synthesis included an additional reduction step using sodium sulphite to convert the nitro group into an amino group.

EXAMPLES 66 TO 71

The method of Example 3 was repeated except that in place of 5-acetylamino-2-aminobenzene carboxylic acid there was used the amine listed in Table 3, column A and in place of 5-nitro-2-aminobenzene sulphonic acid there was used the amine indicated in column B, and in place of cobalt acetate there was used the acetate of the metal indicated. The resultant dye had the formula shown in column C.

TABLE 3

| Ex. | A | B | C | $\lambda_{max}$ (nm) |
|---|---|---|---|---|
| 66 | | | | 600 |
| 67 | | | | 633 |
| 68 | | | | 599 |

TABLE 3-continued

| Ex. | A | B | C | $\lambda_{max}$ (nm) |
|---|---|---|---|---|
| 69 | 3-amino-1,2,4-triazole-5-carboxylic acid | 2-amino-5-nitrobenzenesulfonic acid | [structure] | 642 |
| 70 | 2-amino-5-acetamidobenzoic acid | 2-amino-4-sulfobenzenesulfonic acid | [structure] | 560 |
| 71 | 2-amino-5-nitrobenzoic acid | 2-amino-4-sulfobenzenesulfonic acid | [structure] | 539 |

EXAMPLE 72

Ink Formulations

Inks were prepared according to the following formulation, wherein Dye was each of the dyes from the Examples 1, 2, 3, 9, 33 and 39 above:

| | |
|---|---|
| 2-Pyrrolidone | 5 parts |
| Thiodiglycol | 5 parts |
| Surfynol ™ 465 | 1 part (from Air Products Inc., USA) |
| Dye | 3.5 parts |
| Water | 85.5 parts |

Further inks described in Tables 4 and 5 may be prepared wherein the Dye described in the first column is the Dye made in the above example of the same number. Numbers quoted in the second column onwards refer to the number of parts of the relevant ingredient and all parts are by weight. The inks may be applied to paper by thermal or piezo ink jet printing.

TABLE 4

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 3 | 10.0 | 85 | 3 | | 3 | 3 | | | | 5 | 1 | |
| 4 | 2.1 | 91 | | 8 | | | | | | | | 1 |
| 5 | 3.1 | 86 | 5 | | | | | 0.2 | 4 | | | 5 |
| 6 | 1.1 | 81 | | | 9 | | 0.5 | 0.5 | | | 9 | |
| 7 | 2.5 | 60 | 4 | 15 | 3 | 3 | | | 6 | 10 | 5 | 4 |
| 8 | 5 | 65 | | 20 | | | | | 10 | | | |
| 9 | 2.4 | 75 | 5 | 4 | | 5 | | | | 6 | | 5 |
| 10 | 4.1 | 80 | 3 | 5 | 2 | 10 | | 0.3 | | | | |
| 11 | 3.2 | 65 | | 5 | 4 | 6 | | | 5 | 4 | 6 | 5 |
| 12 | 5.1 | 96 | | | | | | | | 4 | | |
| 13 | 10.8 | 90 | 5 | | | | | | 5 | | | |
| 14 | 10.0 | 80 | 2 | 6 | 2 | 5 | | | 1 | | 4 | |
| 15 | 1.8 | 80 | | 5 | | | | | | | 15 | |
| 16 | 2.6 | 84 | | | 11 | | | | | | 5 | |
| 17 | 3.3 | 80 | 2 | | | 10 | | | | 2 | | 6 |
| 18 | 12.0 | 90 | | | 7 | | 0.3 | | 3 | | | |
| 19 | 5.4 | 69 | 2 | 20 | 2 | 1 | | | | | 3 | 3 |
| 20 | 6.0 | 91 | | | 4 | | | | | | 5 | |

TABLE 5

| Dye | Dye Content | Water | PG | DEG | NMP | CET | TBT | TDG | BDL | PHO | 2P | PI2 |
|---|---|---|---|---|---|---|---|---|---|---|---|---|
| 21 | 3.0 | 80 | 15 | | | 0.2 | | | | | 5 | |
| 22 | 9.0 | 90 | | 5 | | | | | | 1.2 | | 5 |
| 23 | 2.0 | 90 | | 10 | | | | | | | | |
| 24 | 2 | 88 | | | | | | 10 | | | | |
| 25 | 5 | 78 | | | 5 | | | 12 | | | 5 | |
| 26 | 8 | 70 | 2 | | 8 | | | 15 | | | 5 | |
| 27 | 10 | 80 | | 10 | | | | 8 | | 12 | | |
| 28 | 10 | 80 | | | | | | | | | | |

EXAMPLE 73

Ink Jet Printing

The inks prepared in Example 72 were ink-jet printed onto the following papers using a Hewlett Packard DeskJet 560C™:

| Paper | Paper Number: |
|---|---|
| HP Printing Paper ™ | 1 |
| HP Premium Plus ™ MkII | 2 |
| Epson Premium Photo ™ | 3 |
| Ilford Instant Dry ™ | 4 |

The resultant prints generally showed good lightfastness and ozone fastness.

The invention claimed is:

1. A process for printing an image on a substrate comprising applying thereto by means of an ink jet printer a composition comprising a liquid medium and a disazo compound of Formula (1):

A-N=N-L-N=N-A      Formula (1)

wherein:

each A independently is aryl or heteroaryl; and

L is an optionally metallised 1,8-dihydroxynaphthylene group;

provided that:

(i) at most one of the groups represented by A has a hydroxy substituent ortho to the —N=N— groups shown in Formula (1); and (ii) the compound of Formula (1) is not:

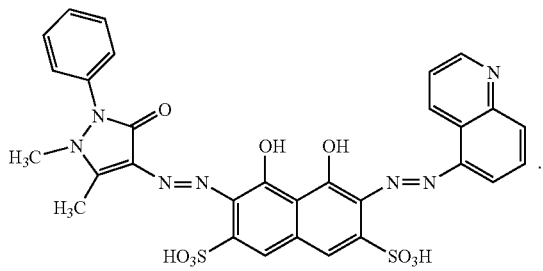

2. A process according to claim 1 wherein at least one of the groups represented by A carries a group selected from sulpho and carboxy.

3. A process according to claim 1 wherein A independently is unsubstituted aryl or heteroaryl or aryl or heteroaryl substituted with a member of the group consisting of OH, $SO_3H$, $PO_3H_2$, $CO_2H$, $NO_2$, $NH_2$, unsubstituted $C_{1-4}$-alkyl, $C_{1-4}$-alkyl carrying a sulpho, carboxy, phosphato, $C_{1-4}$-alkoxy, amino or hydroxy group, unsubstituted $C_{1-4}$-alkoxy or $C_{1-4}$-alkoxy carrying a sulpho, carboxy, phosphato, $C_{1-4}$-alkoxy, $C_{1-4}$-alkyl, amino or hydroxy group, amine, amine carrying one or two unsubstituted $C_{1-4}$-alkyl groups or $C_{1-4}$-alkyl groups substituted with a sulpho, carboxy, phosphato, $C_{1-4}$-alkoxy, amino or hydroxy group, acylamine and ureido.

4. A process according to claim 3 wherein L is a 1,8-dihydroxy-naphthalene group of the Formula (2) or a metal complex thereof:

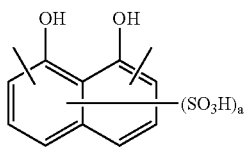

Formula (2)

where a is 1 or 2 and $SO_3H$ is in the free acid or salt form.

5. The process of claim 1 wherein A is selected from the group consisting of 2-sulphophenyl, 3-sulphophenyl, 4-sulphophenyl, 2-nitrophenyl, 3-nitrophenyl, 4-nitrophenyl, 2-sulpho-4-phosphatophenyl, 2-sulpho-4-aminophenyl, 2-sulpho-4-acetylaminophenyl, 2-sulpho-4-methoxyphenyl, 2-sulpho-5-aminophenyl, 3-sulpho-4-nitrophenyl, 3-sulpho-4-aminophenyl, 2-sulpho-4-nitrophenyl, 2,5-disulfophenyl, 2-5-disulpho-4-acetylaminophenyl, 2-hydroxy-3,5-disulphophenyl, 2-carboxy-4-acetylaminophenyl, 2-carboxy-4-aminophenyl, 3,5-dicarboxyphenyl and 2,5-dihydroxyethyloxyphenyl and L is

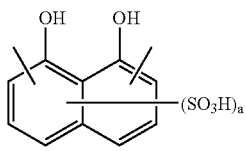

Formula (2)

where a is 2 and the $SO_3H$ groups shown in Formula (2) are in the 3- and 6-positions or the 3- and 5-positions.

6. A composition for ink jet printing comprising:
(a) 0.2 to 12 parts of a disazo compound of Formula (1):

Formula (1)

wherein:
each A independently is aryl or heteroaryl and each A is different; and
L is an optionally metallised 1,8-dihydroxynaphthylene group;
provided that at most one of the groups represented by A has a hydroxy substituent ortho to the —N═N— groups shown in Formula (1) and provided that the compound of Formula (1) does not contain any groups of the formula —SO$_2$—CH$_2$—CH$_2$—O—SO$_3$H or —SO$_2$—CH═CH$_2$; and
(b) from 88 to 99.8 parts of a liquid medium;
wherein all parts are by weight and the number of parts of (a)+(b)=100.

7. A paper, an overhead projector slide or a textile material printed, with a composition as defined in claim 6.

8. An ink jet printer cartridge, optionally refillable, comprising one or more chambers and a composition, wherein the composition is present in at least one of the chambers and the composition is as defined in claim 6.

9. A composition according to claim 6 wherein A independently is unsubstituted aryl or heteroaryl or aryl or heteroaryl substituted with a member of the group consisting of OH, $SO_3H$, $PO_3H_2$, $CO_2H$, $NO_2$, $NH_2$, unsubstituted $C_{1-4}$-alkyl, $C_{1-4}$-alkyl carrying a sulpho, carboxy, phosphato, $C_{1-4}$-alkoxy, amino or hydroxy group, unsubstituted $C_{1-4}$-alkoxy or $C_{1-4}$-alkoxy carrying a sulpho, carboxy, phosphato, $C_{1-4}$-alkoxy, $C_{1-4}$-alkyl, amino or hydroxy group, amine, amine carrying one or two unsubstituted $C_{1-4}$-alkyl groups or $C_{1-4}$-alkyl groups substituted with a sulpho, carboxy, phosphato, $C_{1-4}$-alkoxy, amino or hydroxy group, acylamine and ureido.

10. A composition according to claim 9 wherein L is a 1,8-dihydroxy-naphthalene group of the Formula (2) or a metal complex thereof:

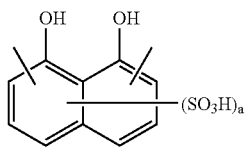

Formula (2)

where a is 1 or 2 and $SO_3H$ is in the free acid or salt form.

11. The composition of claim 6 wherein A is selected from the group consisting of 2-sulphophenyl, 3-sulphophenyl, 4-sulphophenyl, 2-nitrophenyl, 3-nitrophenyl, 4-nitrophenyl, 2-sulpho-4-phosphatophenyl, 2-sulpho-4-aminophenyl, 2-sulpho-4-acetylaminophenyl, 2-sulpho-4-methoxyphenyl, 2-sulpho-5-aminophenyl, 3-sulpho-4-nitrophenyl, 3-sulpho-4-aminophenyl, 2-sulpho-4-nitrophenyl, 2,5-disulfophenyl, 2-5-disulpho-4-acetylaminophenyl, 2-hydroxy-3,5-disulphophenyl, 2-carboxy-4-acetylaminophenyl, 2-carboxy-4-aminophenyl, 3,5-dicarboxyphenyl and 2,5-dihydroxyethyloxyphenyl and L is

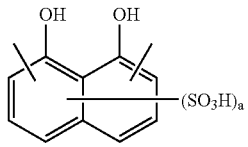

Formula (2)

where a is 2 and the $SO_3H$ groups shown in Formula (2) are in the 3- and 6-positions or the 3- and 5-positions.

12. A disazo compound of Formula (1):

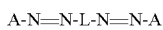 Formula (1)

wherein:
  each A independently is aryl and each A is different; and
  L is an optionally metallised 1,8-dihydroxynaphthylene group;
provided that:
  (i) at most one of the groups represented by A has a hydroxy substituent ortho to the —N═N— groups shown in Formula (1); and
  (ii) at least one of the groups represented by A carries a group selected from sulpho and carboxy; and
  (iii) the compound of formula (1) does not contain any groups of the formula —SO$_2$—CH$_2$—CH$_2$—O—SO$_3$H or —SO$_2$—CH═CH$_2$.

13. A compound of Formula (1) as defined in claim 12 wherein both groups represented by A carry a group selected from sulpho and carboxy.

14. A compound of Formula (1) as defined in claim 13 wherein both groups represented by A carry a sulpho group.

15. A compound of Formula (1) as defined in claim 12 wherein L is of Formula (2)

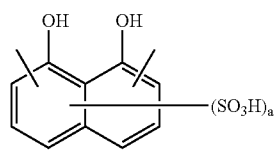 Formula (2)

wherein a is 1 or 2 and SO$_3$H is in free acid or salt form.

16. A process for preparing a compound of Formula (1), as defined in claim 12, which comprises diazotising an amine of formula A-NH$_2$ to give a diazonium salt, and coupling the resultant diazonium salt with a compound of Formula (6):

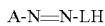 Formula (6)

wherein L and each A independently are as defined in claim 12.

17. A process for the preparation of a compound of Formula (1) as defined in claim 12 which comprises reacting a compound of formula A-N═N-Q-N═N-A with a strong base, wherein each A independently is as defined in claim 12 and Q is 6-hydroxy-8-amino-naphthylene group.

18. A process for preparing a compound of Formula (1):

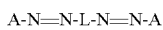

wherein
  each A independently is aryl or heteroaryl and each A is different; and
  L is an optionally metallised 1,8-dihydroxynaphthylene group;
provided that:
  (i) at most one of the groups represented by A has a hydroxy substituent ortho to the —N═N— groups shown in Formula (1);
  (ii) the compound of Formula (1) is not:

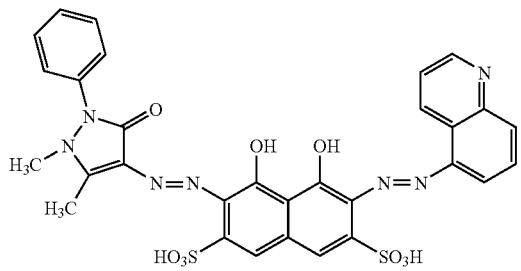

(iii) at least one of the groups represented by A carries a group selected from sulpho and carboxy
  (iv) the compound of formula (1) does not contain any groups of the formula —SO$_2$—CH$_2$—CH$_2$—O—SO$_3$H or —SO$_2$—CH═CH$_2$; and
  (v) the compound of Formula (1) is not either of the following structures:

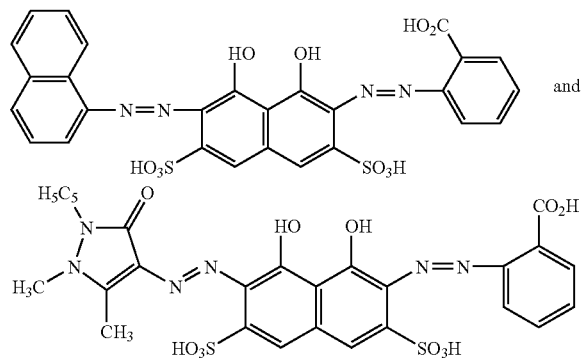

which comprises diazolitising an amine of formula A-NH$_2$ to give a diazonium salt, and coupling the resultant diazonium salt with a compound of Formula (6):

 Formula (6).

* * * * *